United States Patent

[15] 3,653,591

Varga et al.

[45] Apr. 4, 1972

[54] RAIL ANCHORAGES

[72] Inventors: Otto Herman Varga, Bradford-on-Avon; Leonard Taylor, Wells, both of England

[73] Assignee: Resilient Grip Limited, Bristol, England

[22] Filed: July 23, 1970

[21] Appl. No.: 57,703

[30] Foreign Application Priority Data

July 1, 1969 Great Britain.......................38,197/69
Aug. 2, 1969 Great Britain.......................38,852/69

[52] U.S. Cl..............................238/308, 238/283, 238/371, 238/377
[51] Int. Cl. .......................................E01b 9/14, E01b 9/00
[58] Field of Search..................238/287, 371, 377, 283, 308, 238/309

[56] References Cited

UNITED STATES PATENTS

| 2,779,543 | 1/1957 | Gronlund | 238/283 |
|---|---|---|---|
| 3,429,506 | 2/1969 | Triplett | 238/371 |
| 859,207 | 7/1907 | Dean | 238/377 |
| 2,822,986 | 2/1958 | Schreier | 238/377 |
| 1,279,728 | 9/1918 | Liebmann | 238/377 |
| 3,517,883 | 6/1970 | Holstein | 238/283 |

Primary Examiner—Arthur L. La Point
Assistant Examiner—Richard A. Bertsch
Attorney—Shoemaker & Mattare

[57] ABSTRACT

The invention provides an anchorage for securing a flat bottom rail to a solid foundation having at least two circular cylindrical holes preformed therein. The anchorage according to the invention comprises essentially two components, the first component being a metal baseplate having non-circular through holes therein located to register with the preformed holes in the foundation. The second component according to the invention comprises foundation bolt means passing through the holes in the baseplate and in the foundation. The foundation bolt means which comprise a bolt adapted to be passed through the baseplate to engage a nut member located in a hole in the foundation, the nut member being an elongate metal member surrounded at least in part by a sleeve of elastomeric material which can be deformed on axial movement of the nut into engagement with the walls of the foundation hole, said nut member having one end so shaped that it can enter and key with one of the non-circular through holes of the baseplate so that the nut is prevented from rotation relative to the baseplate. The baseplate may be formed with lugs which assist in anchoring the rail and wedge shaped clamping block means may be provided cooperating with the foundation bolt means and the baseplate abutments to secure the rail on the baseplate.

11 Claims, 8 Drawing Figures

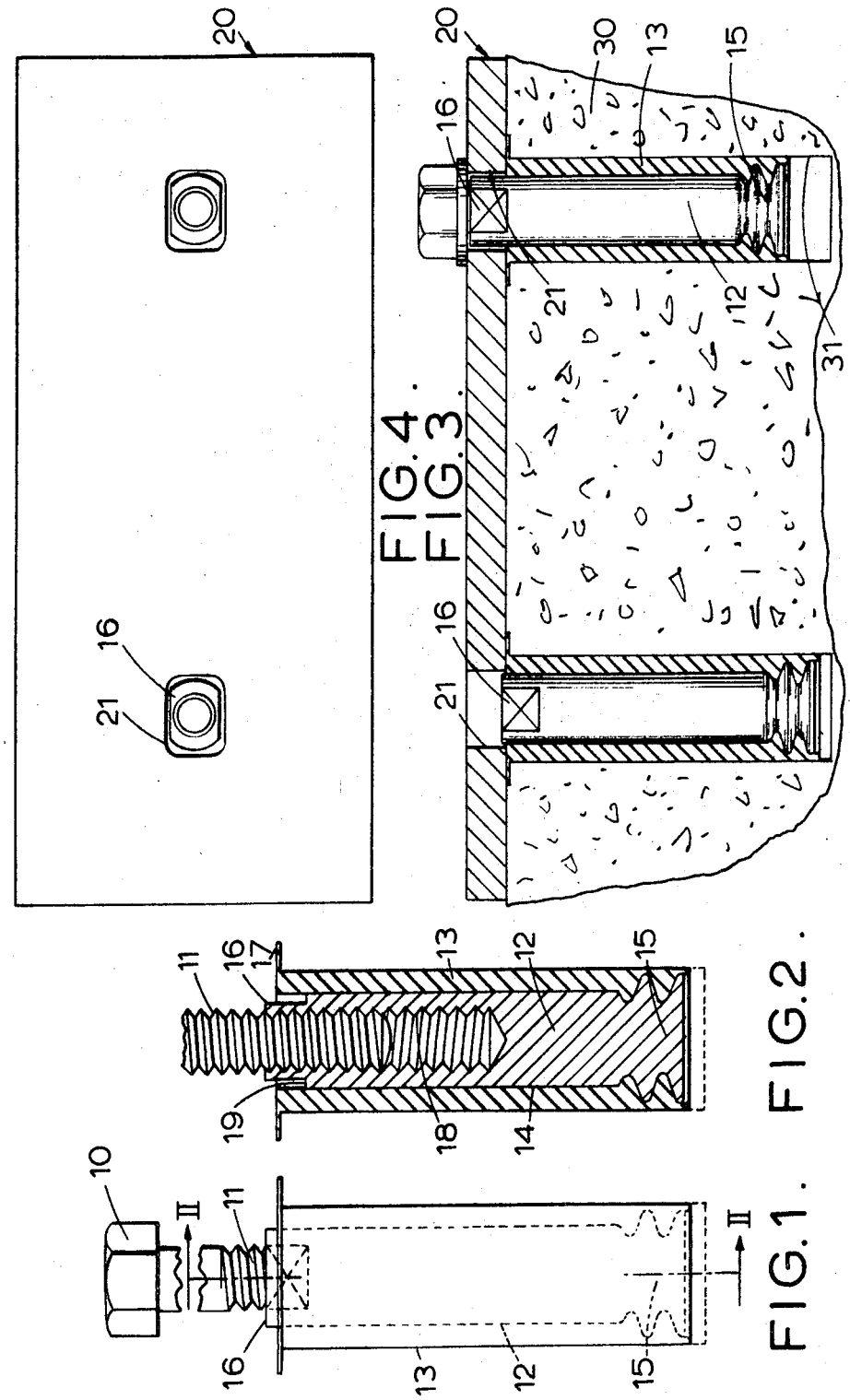

Patented April 4, 1972
3,653,591
3 Sheets-Sheet 2
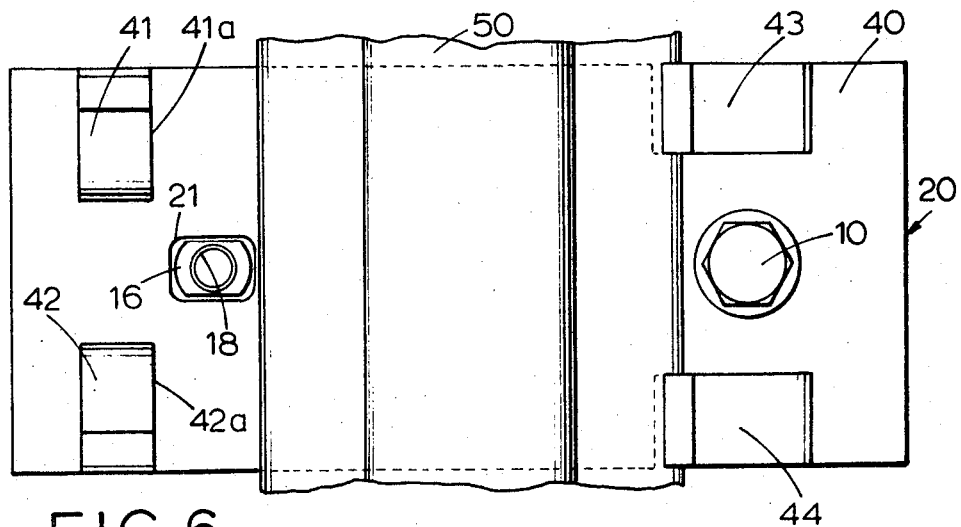
FIG. 6.
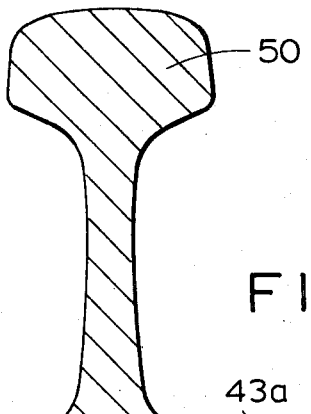
FIG. 5.
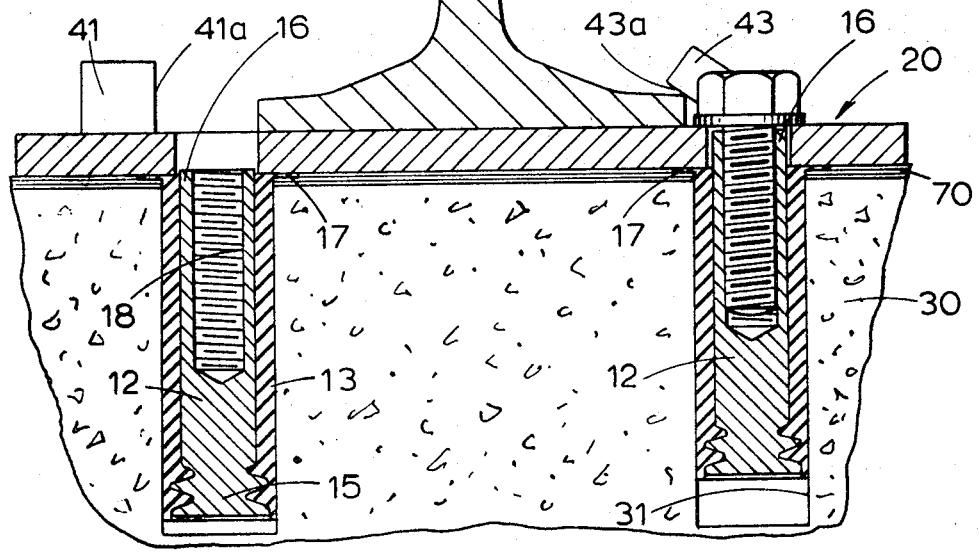
INVENTORS
OTTO HERMAN VARGA
BY LEONARD TAYLOR
Shoemaker and Mattare
ATTORNEYS Patented April 4, 1972
3,653,591
3 Sheets-Sheet 3
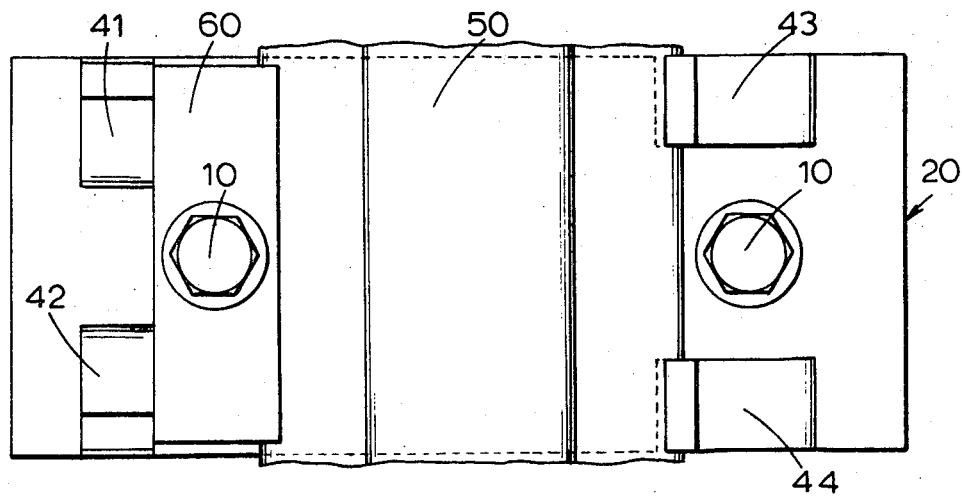
FIG. 8.
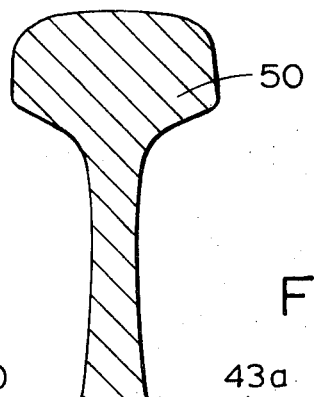
FIG. 7.
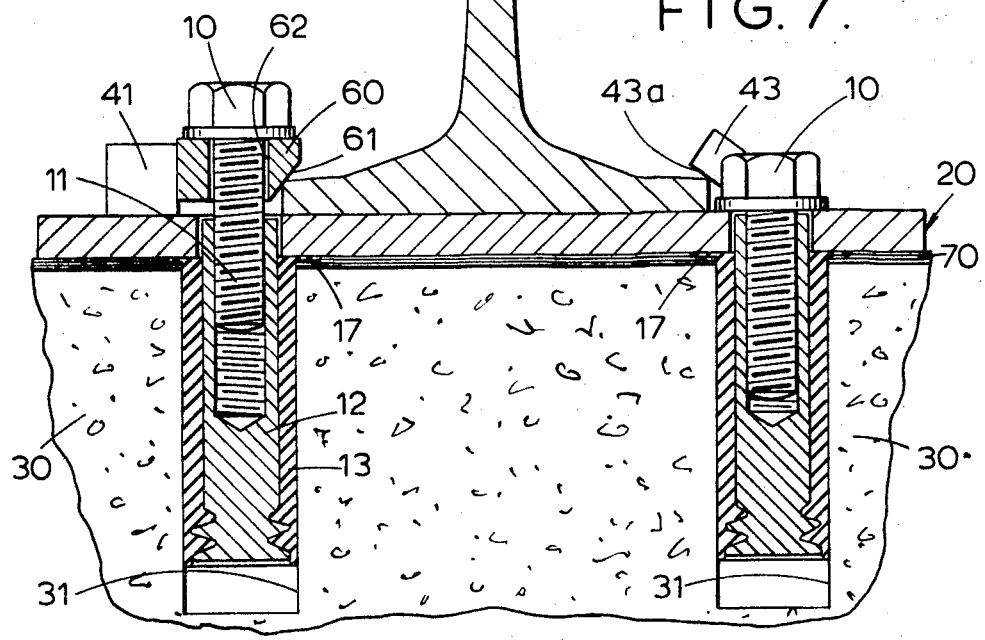
INVENTORS
OTTO HERMAN VARGA
BY LEONARD TAYLOR
Shoemaker and Mattare
ATTORNEYS

RAIL ANCHORAGES

This invention relates to a rail anchorage for securing a flat bottom rail to a solid foundation which may be a concrete sleeper, the foundation having at least two circular cylindrical holes preformed therein.

According to the invention such an anchorage includes a metal baseplate having non-circular through holes located to register with the holes of the foundation and foundation bolt means passing through the holes in registry, and each foundation bolt means comprises a bolt adapted to be passed through the baseplate to engage a nut member located in a hole in the foundation, the nut member being an elongate member surrounded at least in part by a sleeve of elastomeric material which can be deformed, on axial movement of the nut, into engagement with the walls of the foundation hole, said nut member having one end so shaped that it can enter and key with one of the non-circular holes of the baseplate, whereby the nut is prevented from rotation relative to the baseplate.

Preferably the elongate metal nut has a central cylindrical shank region, and an enlarged foot at one end of the shank region, the foot having an external diameter in excess of that of the shank, said shank leading at its opposite end to a keying region of the nut with a non-circular periphery such that when said keying region is engaged in a non-circular hole of said baseplate, the nut is prevented from rotation relative to the baseplate.

The sleeve of elastomeric material advantageously surrounds at least the shank region of the nut and the sleeve has an outside diameter which when the nut is inserted in a foundation hole is a close fit in the hole.

The invention will be further described with reference to the accompanying drawings in which FIG. 1 is a side elevation of a foundation bolt assembly;

FIG. 2 being a cross section view of the bolt assembly of FIG. 1;

FIG. 3 is a cross sectional view illustrating a baseplate partly secured to a foundation by bolt assemblies similar to those shown in FIGS. 1 and 2;

FIG. 4 is a plan view of a baseplate located by nut components of foundation bolt assemblies;

FIG. 5 is a cross sectional view of a partially complete rail anchorage according to the invention;

FIG. 6 is a plan view of the components shown in FIG. 5;

FIG. 7 is a complete rail anchorage according to the invention;

FIG. 8 is a plan view of the anchorage of FIG. 7.

The rail anchorage according to the invention comprises in combination a foundation bolt which will be described first with reference to FIGS. 1 and 2, and a baseplate which is shown in the remaining Figures and will be described later.

Referring first to FIGS. 1 and 2, the foundation bolt means includes three separate components. Firstly there is a bolt proper 10 having a head and a threaded stem 11. Secondly there is an elongate nut member 12 surrounded at least in part by a sleeve 13 of elastomeric material.

As will be seen most clearly in FIG. 2, the nut 12 has a central cylindrical shank region 14 and an enlarged foot 15 at one end of the shank 14. At its opposite end the shank has a keying region 16 having a non-circular periphery.

The elastomeric sleeve 13 encases the whole of the cylindrical shank region 14; however the keying region 16 of the nut projects beyond one end of the sleeve 13, even when the sleeve is in undeformed condition The elastomeric sleeve 13 encases at least the sides of the foot region 15. However, as shown in dotted lines, the sleeve 13 may be extended so as to totally envelop the foot 15 of the nut member 12.

At its end adjacent the keying region 16 of the nut, the sleeve is formed with a thin outwardly extending flared lip 17.

The keying region 16 of each nut 12 is intended to enter a correspondingly non-circular hole formed in the baseplate member having non-circular holes provided according to the invention. One example of such a baseplate having non-circular holes, is shown in FIGS. 3 and 4, the baseplate being identified by reference number 20 and the non-circular holes therein being identified by reference number 21.

In FIG. 3, 30 represents a concrete sleeper or analogous solid foundation, having holes 31 preformed therein at locations such that the holes 21 of the baseplate 20 can be placed in register with the foundation holes 31.

The foundation bolt means described with reference to FIGS. 1 and 2, are intended to secure the baseplate 20 to the foundation 30 as will be described with reference to FIGS. 5 to 8. One or both of the foundation bolt means may also be employed to secure a flat bottom rail on to the baseplate.

The foundation bolt means are utilised by first entering the nut member 12 encased in its elastomeric sleeve 13 in a foundation hole 31. It should be mentioned here that the outside diameter of the sleeve 13 is made such that when it is inserted into a foundation hole 31, it is a close fit against the walls of the hole.

The annular flared lip 17 of the sleeve comes to rest upon an upper surface of the foundation 30, leaving the keying region 16 of each nut 12 protruding a short distance above the upper surface of foundation 30.

The baseplate 20 is laid over two such bolts, which with associated sleeves have been entered in a pair of foundation holes, and the keying regions 16 are caused to enter and register with the non-circular holes 21 in the baseplate. If a bolt 10 is now engaged with the nut member and screwed down, the keying means 16 of each nut registering with the baseplate holes 21 will prevent rotation of the nut relative to the baseplate. Hence when a bolt 10 is tightened down with its threaded stem engaged in a threaded bore 18 of the nut member, the nut member 12 will be raised. When the nut member is raised, its enlarged foot 15 will effectively subject the elastomeric sleeve 13 to axial compression against the underside of the baseplate 20. This axial compression will deform the sleeve into engagement with the walls of the foundation holes 31. Hence when a bolt 10 has been fully tightened down, as is the case with the right-hand bolt shown in FIG. 3, the sleeve 13 will be firmly engaged with the walls of the foundation holes 31.

The depth of the keying region 16 will be such as to leave a shoulder 19 (shown in FIG. 2) which abuts with the underside of the baseplate 20, such abutment limiting the degree of axial movement of the nut 12 on tightening of the bolt 10 and hence preventing the components of the foundation bolt or the foundation 30 from being subjected to inordinate stresses.

The bolt means shown in FIG. 3 may be provided with clips or wedges for the purpose of anchoring to the baseplate 20 a flat bottom rail. In this case the baseplate 20 will comprise a simple rectangular plate.

Alternatively, however, and as will be described with reference to FIGS. 5 to 8, the baseplate may be formed with lugs and may co-operate with the foundation bolt means in securing the flat bottom rail.

The baseplate shown in FIGS. 5 to 8 is an elongate generally rectangular plate 40 having pressed out therefrom a first spaced pair of lugs 41 and 42. The lugs 41 and 42 are located towards one end of the baseplate and define a pair of substantially aligned abutment walls 41a and 42a respectively which extend upwardly substantially at right angles from the upper surface of the baseplate when the latter is positioned on a foundation 30.

Formed towards the opposite end of the baseplate are a second pair of integrally pressed out lugs 43 and 44 respectively and these lugs define a second pair of substantially aligned abutment walls (that of the lug 43 being indicated at 43a in FIG. 5) which extend upwardly from the baseplate at an oblique or V-angle and are inclined in the direction towards the first pair of lugs.

As will be seen from FIGS. 5 and 7, one side of the foot of a flat bottom rail 50 is adapted to be located against the abutment walls defined by the inclined lugs 43 and 44, while the opposite side of the foot of rail 50 is clamped by a wedge member 60 which is tightened down using one of the foundation bolt means provided according to the invention.

The wedge member 60 is adapted to lie against the substantially vertical abutment walls 41a and 42a of the respective lugs 41 and 42, and abuts the rail with an inclined or wedge-shaped surface 61.

The stem 11 of a bolt 10 passes through an aperture 62 formed centrally of the wedge member 60.

The method of assembly of a complete rail anchorage as shown in FIGS. 7 and 8 will now be described.

Firstly the nuts 12 of the foundation bolt means encased in their sleeves 13 are inserted in the preformed holes 31 in the foundation 30. Next the baseplate 20 is laid and the keying region 16 of the two nut members 12 are caused to enter the correspondingly non-circular holes 21 of the baseplate. The nut member 12 located between the inclined lugs 43 and 44 is now engaged with its bolt and this bolt is fully tightened down as limited by the shoulder 19 of the nut keying means abutting the underside of the baseplate. At this stage one side of the baseplate 20 is now firmly anchored to the foundation 30.

The rail 50 is next placed in position with its foot at one side engaged beneath the inclined abutment walls defined by the inclined lugs 43 and 44. The wedge member 60 is then laid against the abutment walls of lugs 41 and 42 with its wedge portion 61 bearing against the rail foot. The second bolt is then engaged with its nut 12 and tightened down. Upward axial movement of the nut 12 will be again limited by the shoulder 19 abutting with the underside of the baseplate whereupon further tightening down of the bolt will cause the wedge member 60 to move towards the baseplate firmly clamping the rail 50 in position against the baseplate.

As shown in the embodiments illustrated in FIGS. 5 to 7, a resilient rail pad 70 has been located between the underside of the baseplate and the solid foundation 30, prior to the insertion of the nuts 12 encased in their sleeves 13 into the foundation holes 31. With this assembly the flared lips 17 of the sleeve initially rest on the upper surface of the resilient pad 70.

The rail anchorage shown in FIGS. 7 and 8 which includes the resilient rail pad 70, and the encasing sleeves 13 of the foundation bolts, provides both the essential resilience and shock and noise damping properties which are required by rail fastenings on concrete foundations, as well as complete electrical insulation between rail and foundation, which is required when track circuit signalling systems are employed.

It will be appreciated that when the bolt means are fully tightened down, the rail 50 and baseplate 20 being both metallic elements, are strongly clamped together to form a rigid structure which floats on the foundation 30 through the medium of the resilient elements comprising rail pad 70 and the two elastomeric sleeves 13. This absorbs small oscillatory movements which may be set up between the rail and the foundation.

Finally it will be noted that the rail foot is clamped over the full width of the baseplate. If the baseplate is sufficiently wide, for example four inches or more in width, the clamping effect will provide useful location in the direction longitudinally of the rail.

We claim

1. An anchorage for securing a flat bottom rail to a solid foundation, the foundation having at least one circular cylindrical hole preformed therein, the anchorage including a metal baseplate having a non-circular through hole located to register with each hole of the foundation and foundation bolt means passing through the holes in registry, each foundation bolt means comprising a bolt adapted to be passed through the baseplate to engage a nut member located in the preformed foundation hole, the nut member being an elongate member surrounded at least in part by a sleeve of elastomeric material which can be deformed into engagement with the walls of the foundation hole, and which before deformation is a push fit in the preformed foundation hole and wherein the elongate metal nut has a central cylindrical shank region and an enlarged foot at one end of the shank region, the foot having an external diameter in excess of that of the shank, the elastomeric sleeve encasing at least said shank region and said shank leading at its opposite end to a keying region of the nut with a non-circular periphery such that when said keying region is engaged in a non-circular hole of said baseplate, the nut is prevented from rotation relative to the baseplate.

2. An anchorage according to claim 1 wherein the bolt has a threaded stem which can be passed through the hole in the baseplate and engaged with a threaded bore of the nut member inserted in the foundation hole, the arrangement being such that on said bolt being tightened down, said nut is moved axially upwardly in the foundation hole to cause firstly, the enlarged foot of the nut to subject said elastomeric sleeve to axial compression between the said foot and the underside of the baseplate, and secondly, to cause the keying region of the nut to become engaged in the non-circular hole in the baseplate.

3. An anchorage according to claim 2 including shoulder means on said nut between said keying region and said shank region effective to abut against the underside of the baseplate to limit upward movement of the nut on tightening down of the bolt and hence to limit the degree of axial compression which can be applied to said elastomeric sleeve.

4. An anchorage according to claim 1 wherein said elastomeric sleeve has at one axial end a thin integral outwardly extending flared lip of diameter greater than that of the foundation hole.

5. An anchorage according to claim 1 wherein prior to deformation of said elastomeric sleeve the keying region of the nut projects from the upper end of the sleeve.

6. An anchorage according to claim 1 wherein said enlarged foot of the nut has annular corrugations and wherein said elastomeric sleeve surrounds not only said shank region, but also said corrugated foot.

7. An anchorage according to claim 6 wherein said elastomeric sleeve totally encases said shank and said foot of said nut member.

8. An anchorage according to claim 1 wherein the baseplate has a spaced pair of holes adapted to register with a pair of preformed holes in the foundation and including a flat upper surface of said baseplate between said spaced pair of holes on which the foot of a flat bottom rail is adapted to rest when said baseplate has been laid with its holes in registry with the foundation holes.

9. An anchorage according to claim 8 wherein the baseplate is an elongate generally rectangular plate having pressed out therefrom a first spaced pair of lugs integral therewith and located towards one end thereof and a second spaced pair of integral lugs located towards an opposite end thereof, said first pair of lugs defining a pair of substantially aligned abutment walls which extend substantially at right angles from the upper surface of the baseplate, and said second pair of lugs defining a second pair of substantially aligned abutment walls which extend upwardly from the baseplate at an oblique angle and are inclined in the direction towards said first pair of lugs, with both said pairs of walls being substantially parallel with the axis of the rail.

10. An anchorage according to claim 9 including a metal wedge member having a through hole which when the member has been laid against said first pair of lugs, can be placed in register with a hole in the baseplate and secured to the baseplate by said foundation bolt means, and said wedge member having an inclined surface which can be employed to bear down on a foot of a flat bottom rail, in wedge clamping fashion, on tightening down on said bolt means.

11. An anchorage according to claim 8 including a resilient pad interposed between the baseplate and the foundation, the pad having preformed holes which can be placed in register with those of the baseplate.

* * * * *